US011232491B2

(12) United States Patent
Volz

(10) Patent No.: US 11,232,491 B2
(45) Date of Patent: Jan. 25, 2022

(54) PROXIMITY BASED MECHANISMS FOR CUSTOMER-SERVICE INTERACTION FEEDBACK

(71) Applicant: Volz Surgical Consulting Inc., Dakota Dunes, SD (US)

(72) Inventor: Lawrence Thomas Volz, Dakota Dunes, SD (US)

(73) Assignee: BAYPOINT TECHNOLOGY, LLC, Dakota Dunes, SD (US)

( * ) Notice: Subject to any disclaimer, the term of this patent is extended or adjusted under 35 U.S.C. 154(b) by 221 days.

(21) Appl. No.: 16/536,999

(22) Filed: Aug. 9, 2019

(65) Prior Publication Data

US 2020/0051141 A1 Feb. 13, 2020

Related U.S. Application Data

(60) Provisional application No. 62/717,616, filed on Aug. 10, 2018.

(51) Int. Cl.
*G06Q 30/02* (2012.01)
*H04W 4/06* (2009.01)
*H04W 4/80* (2018.01)
*H04L 29/08* (2006.01)

(52) U.S. Cl.
CPC ....... *G06Q 30/0282* (2013.01); *H04L 67/306* (2013.01); *H04W 4/06* (2013.01); *H04W 4/80* (2018.02)

(58) Field of Classification Search
CPC .................................. H04W 4/06; H04W 4/80
See application file for complete search history.

(56) References Cited

U.S. PATENT DOCUMENTS

| 2010/0211428 A1* | 8/2010 | Duffy | G06Q 10/06 705/7.14 |
| 2015/0254704 A1* | 9/2015 | Kothe | G06Q 30/0225 705/14.26 |
| 2016/0217425 A1* | 7/2016 | Baird | G06Q 10/1053 |

* cited by examiner

*Primary Examiner* — Tuan H Nguyen
(74) *Attorney, Agent, or Firm* — Alston & Bird LLP

(57) ABSTRACT

Various embodiments are directed to systems and methods for providing employee data corresponding to individual employees to a customer computing entity operated by a customer. The employee data is provided so as to provide additional detail regarding an employee involved in a customer service interaction with the customer. The employee data is broadcast from an employee beacon carried by a respective employee. The employee data is received by a customer computing entity within the broadcast range of the employee beacon and, upon detection of a trigger event, the employee data is presented to the user via a graphical user interface of the customer computing entity, which requests that the customer provide feedback data regarding the employee, which may be transmitted to a management computing entity for storage and analysis.

14 Claims, 10 Drawing Sheets

PROXIMITY BASED MECHANISMS FOR CUSTOMER-SERVICE INTERACTION FEEDBACK

CROSS-REFERENCE TO RELATED APPLICATIONS

This patent application claims priority from U.S. Provisional Appl. Ser. No. 62/717,616, filed Aug. 10, 2018, which is incorporated herein by reference in its entirety.

BACKGROUND

Except in the smallest of businesses, companies providing services to customers are represented by a subset of the company's roster of employees, who are acting on behalf of the company. In some circumstances, a small subset of the companies' employees can therefore have a large impact on a particular customer's experiences when working with the company. These experiences may be exceptionally positive, for example, when a particular employee goes above and beyond his or her job duties to provide truly exceptional customer service to a particular individual; or these experiences may be exceptionally negative, for example, when a particular employee does not provide proper services to a particular customer. In either instance, that single employee may impact whether the customer decides to do business with the company in the future, even if the customer's experiences were an outlier relative to the overall customer service associated with the company.

In more extreme circumstances, a particular company (or other organization) may receive funding based on an overall level of customer satisfaction with the services provided by the company or other organization. For example, hospital funding may be at least partially dependent on the results of patient satisfaction surveys disseminated to patients upon leaving the hospital. Again, a single employee (e.g., a single doctor, nurse, janitor, assistant, and/or the like) may make a strong impact on the patient's overall experiences with the organization, which may ultimately influence the review the patient provides after leaving the hospital or other organization.

However, current mechanisms for reviewing the services received by a particular customer/patient at a business/company/organization are provided at a high, aggregated level. Thus, the actions of individual employees of the business/company/organization may influence the overall rating that the customer/patient provides, but the business/company/organization is incapable of determining which employees interacted with the customer/patient, and therefore which employees may have influenced the customer/patient's overall rating.

Accordingly, a need exists for determining which of a plurality of employees interacted with a particular customer/patient to provide the customer/patient with more granular review options to provide information as to the experiences they had with particular employees of the company/business/organization.

BRIEF SUMMARY

Various embodiments are directed to systems and methods that utilize employee-unique identifiers (e.g., electronic identifiers stored within employee-specific beacons carried by respective employees) to interact with consumer-owned devices, for example, via an application executing on those consumer-owned devices. The application enables the consumer to identify and/or rate/review his/her service interaction with an employee in real-time or near real-time. Feedback data generated via the application executing on the consumer-owned devices, for example, based on user input from respective consumers, may be provided to employer-operated computing entities, thereby enabling employers to receive real-time feedback on customer-employee interactions.

Various embodiments are directed to a system for providing employee data regarding customer-service interactions to a customer computing entity. In certain embodiments, the system comprises: one or more employee beacons configured to be carried by an employee, each of the one or more employee beacons comprising: a memory storage area storing employee data corresponding to a respective employee, and a wireless transmitter configured to broadcast the employee data stored within the memory storage area for receipt by a customer computing entity; and a management computing entity comprising: one or more memory storage areas collectively storing a plurality of employee profiles; and one or more processors collectively configured to: receive, from a customer computing entity, feedback data and employee data; and update an employee profile of the plurality of employee profiles corresponding to the employee data to reflect the feedback data.

In certain embodiments, the memory storage area of each of the one or more employee beacons stores employee identifying data; and wherein the one or more processors of the management computing entity are further configured to: receive, from the customer computing entity, employee identifying data; query the one or more memory storage areas to retrieve additional employee data corresponding to the employee identifying data; and transmit, to the customer computing entity, at least a portion of the additional employee data. In various embodiments, the one or more processors of the management computing entity are further configured to transmit to a corresponding employee beacon, update data to reflect the updates to the employee profile to reflect the feedback data. Moreover, in certain embodiments, the wireless transmitter of each of the one or more employee beacons is embodied as a Bluetooth Low Energy wireless transmitter. In various embodiments, the one or more processors of the management computing entity are further configured to: receive, from the customer computing entity, a customer identifier with the feedback data and the employee data; and store, within a customer profile corresponding to customer identifier, at least a portion of the employee data. In certain embodiments, the one or more processors of the management computing entity are further configured to generate an alert upon receipt of the feedback data.

Certain embodiments are directed to a computer-implemented method for providing employee data regarding customer-service interactions to a customer computing entity. In various embodiments, the method comprises: wirelessly broadcasting, from an employee beacon, employee data stored within a memory storage area of the employee beacon for receipt by a customer computing entity; and receiving, via one or more processors of a management computing entity and from a customer computing entity, feedback data and employee data; and updating, via the one or more processors of the management computing entity, an employee profile of a plurality of employee profiles stored within an employee database corresponding to the employee data to reflect the feedback data.

In certain embodiments, the memory storage area of each of the one or more employee beacons stores employee identifying data; and wherein the method further comprises: receiving, via the one or more processors of the management computing entity and from the customer computing entity, employee identifying data; querying, via the one or more processors of the management computing entity, the one or more memory storage areas to retrieve additional employee data corresponding to the employee identifying data; and transmitting, via the one or more processors of the management computing entity and to the customer computing entity, at least a portion of the additional employee data.

In various embodiments, transmitting, from the one or more processors of the management computing entity to a corresponding employee beacon, update data to reflect the updates to the employee profile to reflect the feedback data. In certain embodiments, broadcasting employee data from the employee beacon comprises broadcasting via a Bluetooth Low Energy wireless transmission protocol. According to various embodiments, the method may further comprise receiving, via the one or more processors of the management computing entity and from the customer computing entity, a customer identifier with the feedback data and the employee data; and storing, via the one or more processors of the management computing entity and within a customer profile corresponding to customer identifier, at least a portion of the employee data. In certain embodiments, the method further comprises generating, via the one or more processors of the management computing entity, an alert upon receipt of the feedback data.

Various embodiments are directed to a computer-program product for providing employee data regarding customer-service interactions to a customer computing entity, the computer program product comprising at least one non-transitory computer-readable storage medium having computer-readable program code portions stored therein, the computer-readable program code portions comprising an executable portion configured to: wirelessly broadcast, from an employee beacon, employee data stored within a memory storage area of the employee beacon for receipt by a customer computing entity; and receive, via one or more processors of a management computing entity and from a customer computing entity, feedback data and employee data, wherein the feedback data corresponds to employee data received at the customer computing entity from an employee beacon wirelessly broadcasting the employee data; and update, via the one or more processors of the management computing entity, an employee profile of a plurality of employee profiles stored within an employee database corresponding to the employee data to reflect the feedback data.

Various embodiments further comprise executable portions configured to: receive, via the one or more processors of the management computing entity and from the customer computing entity, employee identifying data; query, via the one or more processors of the management computing entity, the one or more memory storage areas to retrieve additional employee data corresponding to the employee identifying data; and transmit, via the one or more processors of the management computing entity and to the customer computing entity, at least a portion of the additional employee data.

Certain embodiments further comprise executable portions configured to transmit, from the one or more processors of the management computing entity to a corresponding employee beacon, update data to reflect the updates to the employee profile to reflect the feedback data. In various embodiments, the computer program product is further configured to receive, from the customer computing entity, a customer identifier with the feedback data and the employee data; and store at least a portion of the employee data within a customer profile corresponding to customer identifier. In various embodiments, the computer program product further comprises executable portions configured to generate an alert upon receipt of the feedback data.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1:
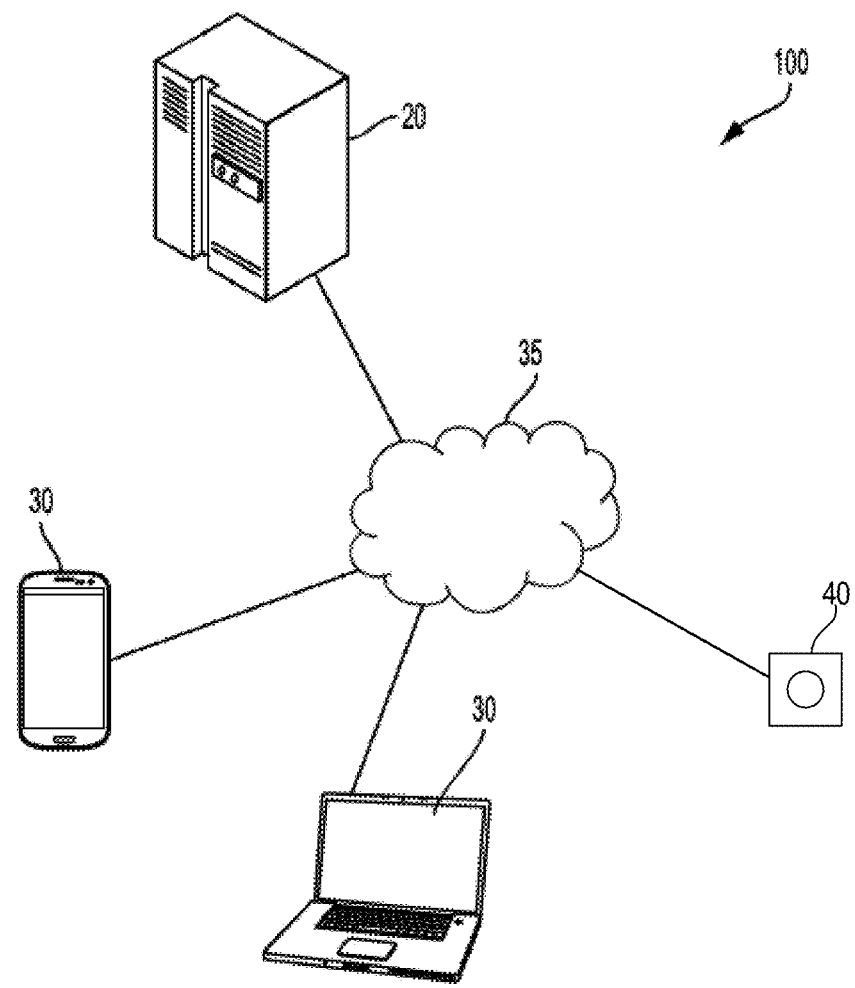
FIG. 1 shows a schematic diagram of a management system according to one embodiment.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

I. Overview

Various embodiments are directed to systems and methods for tracking the proximity of electronic beacons carried by individual employees relative to computing entities carried by customers, and to enable customers to provide granular service reviews of the employees with whom they interacted during their experiences with a particular organization. The system may utilize one or more thresholds (e.g., distance thresholds, time thresholds, minimum number of visits thresholds, and/or the like) to ensure that customers are only able to provide reviews for those employees with which they had meaningful interactions during their experiences with the organization. For example, in a hospital setting, a patient may be enabled to provide reviews for his/her attending physician after leaving the hospital based on the amount of time the physician spent in the same room as the patient and/or the number of visits of the physician into the same room as the patient, however the patient may not be given the opportunity to review a nurse that mistakenly entered the patient's room once for only a few seconds before leaving.

Accordingly, components of the system may be configured for tracking the length of time that individual employees are in close proximity with a particular customer (e.g., within the same room as a customer/patient), the number of times that individual employees come into close proximity with a particular customer (e.g., the number of times the individual employee enters a room with the customer/patient), and/or the like.

In certain embodiments, each employee (representative, contractor, and/or other terms used herein interchangeably) carries an electronic beacon having employee identifying data stored thereon. The electronic beacon may be embodied as a Bluetooth Low Energy (BLE) beacon, an RFID beacon (active or passive), and/or the like. The electronic beacon may be carried by the employee (e.g., in his/her pocket), or the electronic beacon may be secured onto the employee (e.g., sewn into the employee's clothing, pinned to the employee's clothing, and/or the like). The employee identifying data may be provided to the electronic beacon by transmitting employee identifying data from a centralized management computing entity, from an employee's computing entity, and/or the like. For example, an employee's computing entity may have an appropriate software app installed thereon that is configured to generate employee identifying data files comprising employee identifying data to be transmitted to and stored on an employee beacon. Moreover, although the included discussion indicates that data stored on a beacon and transmitted therefrom may be indicative of an identity of an employee, it should be understood that any data may be added to a beacon for transmission to customer computing entities. For example, other data that may be stored on a beacon may comprise behavior instructions for individuals (e.g., in a public safety incident, such instructions may be transmitted from beacons of public safety officers to a plurality of individuals simultaneously).

Figure 4:
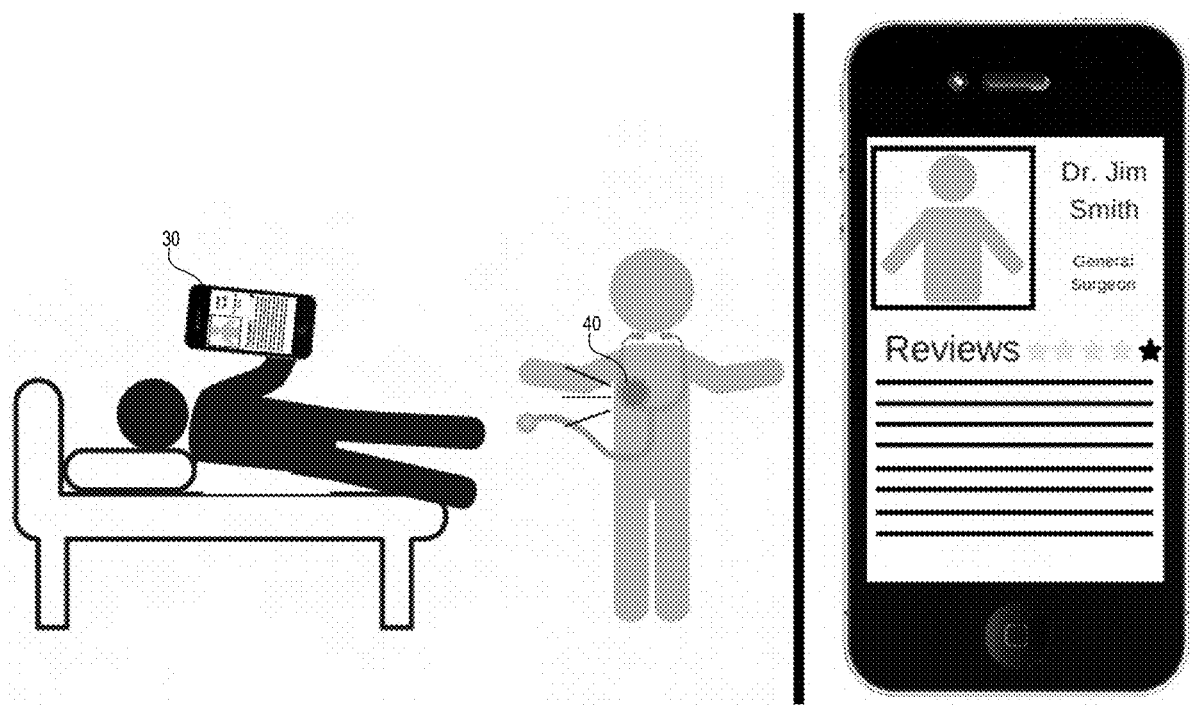
FIGS. 4-7 show example usages of a management system according to certain embodiments.

The electronic beacon associated with each employee may broadcast the employee data (e.g., continuously, periodically, upon detecting one or more nearby computing entities, and/or the like) such that it may be detectable by a nearby customer's (patient, and/or other terms used herein interchangeably) computing entity (e.g., as illustrated in FIG. 4). In certain embodiments, data broadcast from a beacon may be detectable by a plurality of computing entities simultaneously. The electronic beacon may broadcast the employee data in a data file format usable by a specifically configured software app (an "app") installed on the customer's computing entity. The employee data may comprise one or more of: a photo of the employee, an indication of the employee's name, title, prior customer rating, and/or other biographic information about the employee. In certain embodiments, the employee data may be tailored to a particular customer upon receipt of the employee data at the customer's computing entity. For example, employee data provided to the customer via a graphical user interface may provide an indication that a particular employee is assigned to the customer/patient (e.g., "Dr. Smith is your attending physician"). Such data may be received via a network interface at the customer's computing entity (e.g., from a centralized management computing entity) and appended to employee identifying data once received from employee identifying beacons.

Upon receipt of employee data, the app on the customer's computing entity may await the occurrence of a trigger event before providing an indication to the customer of the employee's identity. For example, the app on the customer's computing entity may await a determination that the signal strength received from the employee's beacon exceeds a minimum threshold level (indicating the employee is within a threshold distance away from the customer). As yet another example, the app on the customer's computing entity may await a determination of whether the employee beacon is detected for a consecutive minimum period of time (indicating the employee is nearby to the customer for at least a minimum period of time). Once any applicable display criteria are satisfied, the customer's computing entity may generate a display for the customer providing biographic data about the employee. Upon determining that a trigger event does not occur (e.g., the employee's beacon is determined to be within a particular area for less than a minimum amount of time) the employee identifying data may be deleted from the customer's computing entity. However, upon determining that the trigger event does occur (e.g., the employee's beacon is determined to be within the particular area for more than the minimum amount of time), at least a portion of the employee identifying data may be stored locally at the customer's computing entity (or it may be stored at the management computing entity in association with a customer's profile) such that the employee may later provide rating data regarding the employee.

Figure 5:

In certain embodiments, the customer's computing entity may, upon the occurrence of a rating trigger event, request that the customer provide a rating of services provided from each of the employees that interacted with the customer, via a user interface (e.g., an example of which is shown at FIG. 5). Specifically, the customer's computing entity may track the employee identifying data received at the computing entity (e.g., by storing at least a portion of the employee identifying data locally at the customer's computing entity), and upon the occurrence of the rating trigger event, the customer's computing entity may request that the customer provide a rating for each of the employees for which employee identifying data was received at the customer's computing entity. For example, upon the occurrence of a particular time (e.g., 5 PM daily), upon the determination that the customer has reached a defined location (e.g., the customer's computing entity is determined to be outside of a geofenced area surrounding the organization), and/or the like, the customer's computing entity may request that the customer provide feedback for each employee that the customer interacted with.

In certain embodiments, the customer computing entity may be configured to receive user input indicative of feedback data, and to transmit that feedback data to an appropriate management computing entity in an anonymous fashion, such that customers may provide feedback regarding particular employees without requiring the customers to provide any personally identifying information. Because the customer computing entity may be limited to providing feedback data regarding employees for which the customer had a personal customer service interaction with (as determined by proxy, for example, based on detected employee data received at the customer computing entity and satisfying applicable criteria), even anonymous feedback may be provided while ensuring that feedback is only provided for real, actual customer service interactions.

In other embodiments however, customers may be associated with customer profiles storing identifying information regarding the customer (e.g., a unique customer identifier, customer contact information, and/or the like). When feedback data is generated at the customer computing entity and transmitted to the management computing entity in such embodiments, the feedback data may be transmitted together with the unique customer identifier, thereby enabling the management computing entity to correlate the feedback data with the customer profile. In this manner, the management computing entity (and/or the customer computing entity) may store a log of customer service interactions of the particular customer. The log may comprise employee data for each of a plurality of customer service interactions (and/or data indicative of the day/time during which the particular customer service interaction occurred). Thus, the customer may later reference the log to retrieve data regarding historical customer service interactions.

In certain embodiments, the customer's computing entity generates feedback data indicative of the customer's provided feedback regarding employees with which they interacted. The customer's computing entity may then transmit the generated feedback data to one or more management computing entities or other computing entities. The feedback data may be disseminated to one or more additional computing entities, such as computing entities operated by one or more employee supervisors. Accordingly, the employee supervisors may receive feedback data indicative of various customers' opinions as to how they were treated while interacting with employees of the business. The feedback data may be provided to supervisors' computing entities at defined time intervals, immediately upon receipt at the management computing entity, and/or the like. In certain embodiments, the feedback data may be provided to supervisors' computing entities shortly after the customer computing entity generates the feedback data (e.g., immediately after the feedback data is received at the management computing entity), such that the supervisor may visit the customer to discuss the feedback before the customer leaves the business location. In certain embodiments, the management computing entity may be configured to determine whether the feedback data is reflective of good feedback or bad feedback (e.g., by comparing received feedback data against a reference table), and to transmit only bad feedback to supervisors' computing entities immediately.

Moreover, it should be understood that the customer's computing device may, in certain instances, be configured for receiving other types of data (e.g., via user input), such that data provided from the customer computing entities may encompass data beyond feedback data. For example, in public safety incidents, customer computing entities may be configured to receive data indicative of the condition of various individuals, the number of perpetrators (e.g., in a hostage situation), number of victims, and/or the like.

a. Technical Problem

Employees in various customer-facing industries (service industries, retail, healthcare, and/or the like) are capable of creating either an exceptional or a destructive experience for a customer's interaction with the employer those employees represent. Due to the personal employee/customer interaction in these fields, supervisors and management are often left unaware of specific interactions that require attention until it is too late to address a customer's concerns, such as after the customer has publicly posted a negative review of the employer online (e.g., on Google, Facebook, Yelp, and/or other websites). Most evaluations of these employee-customer interactions submitted by customers/patients are primarily based upon exceptionally positive or exceptionally negative experiences. Employees generally understand that they are not held accountable for every customer interaction (partially due to the relatively high time commitment required for customers to post reviews of their interactions). When customers do take the time to provide feedback, such as through public review networks or through employer-specific feedback request surveys, the feedback data provided by the customer arrives long after any incident, leaving supervisors unable to directly address any issues with their employees immediately. Thus, employers risk their success and reputation on the interactions between their hired employees and the employer's customers, even though the employers are unable to address poor customer service in real-time. These risks are particularly acute in the healthcare industry, where payor contracting dollars (e.g., funds provided by third-party healthcare payors for healthcare services) may be provided at least partially based on positive customer service interactions reported by patients (e.g., specifically, through a CMS-value based reimbursement system used in certain healthcare contexts). Other industries face similar report inadequacy problems, such as the QSR feedback system utilized by certain food-service establishments, which is typically embodied as a receipt-based system utilized to garner customer feedback in a manner that typically only results in receipt of feedback relating to problematic customer-service interactions, and rarely results in receipt of feedback relating to exception service remarks.

b. Technical Solution

Various embodiments drastically reduce the time commitment required for customers to provide feedback relating to customer-service interactions with specific employees and provide capabilities of providing more granular feedback by customers relating to interactions with specific employees. Customers are not required to remember the identity of specific employees with whom they interacted until a later time when the customer may (or may not) remember to provide a review for their interaction with specific employees. Instead, the customer's own computing entity (e.g., a smartphone or other portable computing entity capable of wireless connection with electronic beacons) may collect and store data indicative of the identity of specific employees with whom the customer interacted based on unique identification data broadcast from beacons carried by employees. Upon the detection of specific trigger events configured to avoid enabling customers to review employees with whom they had little or no interaction with, the customer's computing entity (via an app) may enable the customer to provide feedback regarding the specific employees they interacted with.

II. Computer Program Products, Methods, and Computing Entities

Embodiments of the present invention may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of a data structure, apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. Exemplary System Architecture

FIG. 1 provides an illustration of a management system 100 that can be used in conjunction with various embodiments of the present invention. As shown in FIG. 1, the management system 100 may comprise one or more management computing entities 20, one or more customer computing entities 30, one or more networks 35, one or more employee beacons 40, and/or the like. Each of the components of the system may be in electronic communication with, for example, one another over the same or different wireless or wired networks 35 including, for example, a wired or wireless Personal Area Network (PAN), Local Area Network (LAN), Metropolitan Area Network (MAN), Wide Area Network (WAN), and/or the like. Additionally, while FIG. 1 illustrates certain system entities as separate, stand-alone entities, the various embodiments are not limited to this particular architecture.

a. Exemplary Management Computing Entity

Figure 2:
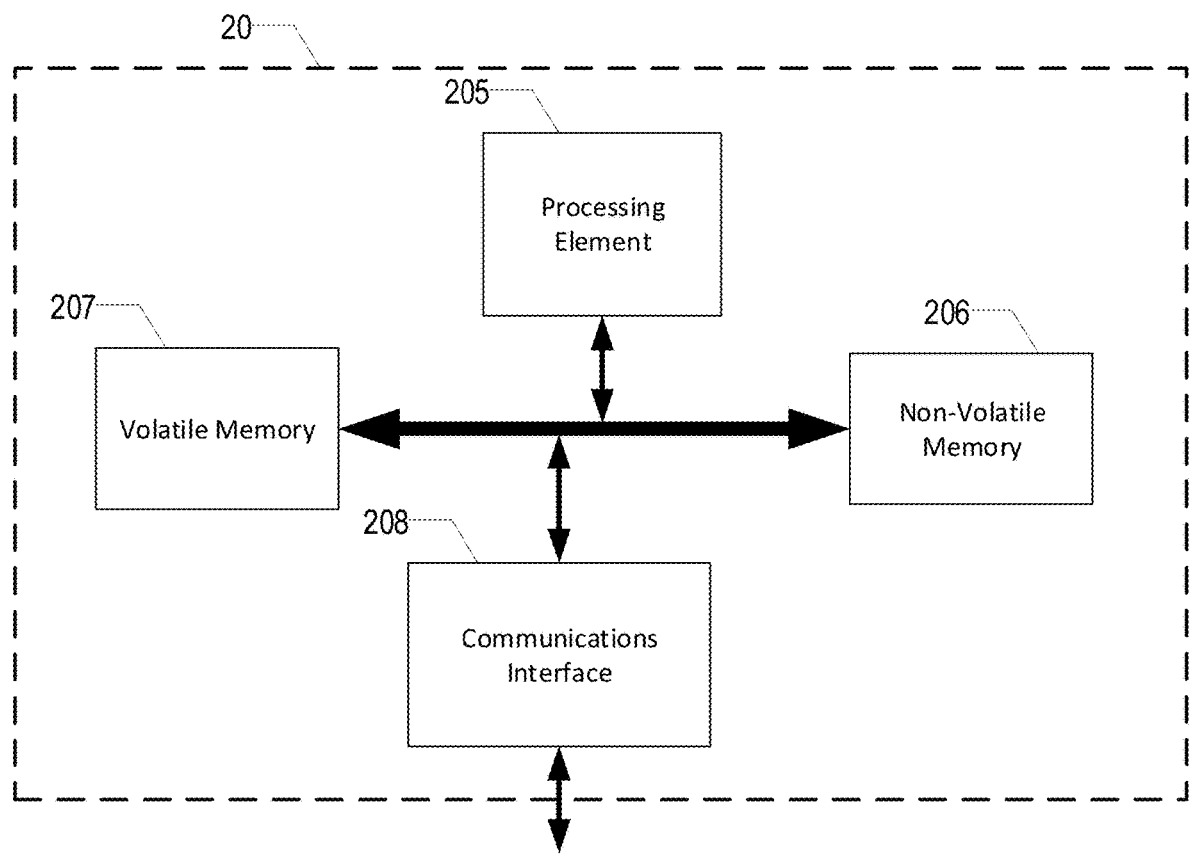
FIG. 2 shows a schematic diagram of a management computing entity according to one embodiment.

FIG. 2 provides a schematic of a management computing entity 20 according to one embodiment of the present invention. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the management computing entity 20 may also include one or more network and/or communications interfaces 208 for communicating with various computing entities, such as by communicating data, content, information, and/or similar terms used herein interchangeably that can be transmitted, received, operated on, processed, displayed, stored, and/or the like. For instance, the management computing entity 20 may communicate with other computing systems, one or more customer computing entities 30, and/or the like.

As shown in FIG. 2, in one embodiment, the management computing entity 20 may include or be in communication with one or more processing elements 205 (also referred to as processors, processing circuitry, and/or similar terms used herein interchangeably) that communicate with other elements within the management computing entity 20 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the management computing entity 20 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 206 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably may refer to a structured collection of records or information/data that is stored in a computer-readable storage medium, such as via a relational database, hierarchical database, and/or network database.

Memory media 206 may also be embodied as a data storage device or devices, as a separate database server or servers, or as a combination of data storage devices and separate database servers. Further, in some embodiments, memory media 206 may be embodied as a distributed repository such that some of the stored data is stored centrally in a location within the system and other data is stored in one or more remote locations. Alternatively, in some embodiments, the distributed repository may be distributed over a plurality of remote storage locations only. As a person of ordinary skill in the art would recognize, the data required for the operation of the management system may also be partially stored in the cloud data storage system and partially stored in a locally maintained data storage system.

In one embodiment, the management computing entity 20 may further include or be in communication with volatile media (also referred to as volatile storage, memory, memory storage, memory circuitry and/or similar terms used herein interchangeably). In one embodiment, the volatile storage or memory may also include one or more volatile storage or memory media 207 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element 308. Thus, the databases, database instances, database management system entities, data, applications, programs, program modules, scripts, source code, object code, byte code, compiled code, interpreted code, machine code, executable instructions, and/or the like may be used to control certain aspects of the operation of the management computing entity 20 with the assistance of the processing element 205 and operating system.

As indicated, in one embodiment, the management computing entity 20 may also include one or more network and/or communications interfaces 208 for communicating with various computing entities, such as by communicating data, content, information, and/or similar terms used herein interchangeably that can be transmitted, received, operated on, processed, displayed, stored, and/or the like. For instance, the management computing entity 20 may communicate with computing entities or communication interfaces of other computing systems 20, customer computing entities 30, and/or the like.

As indicated, in one embodiment, the management computing entity 20 may also include one or more network and/or communications interfaces 208 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the management computing entity 20 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol. The management computing entity 20 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the management computing entity's 20 components may be located remotely from other computing system components, such as in a distributed system. Furthermore, one or more of the components may be aggregated and additional components performing functions described herein may be included in the management computing entity 20. Thus, the management computing entity 20 can be adapted to accommodate a variety of needs and circumstances.

b. Exemplary Customer Computing Entity

Figure 3:
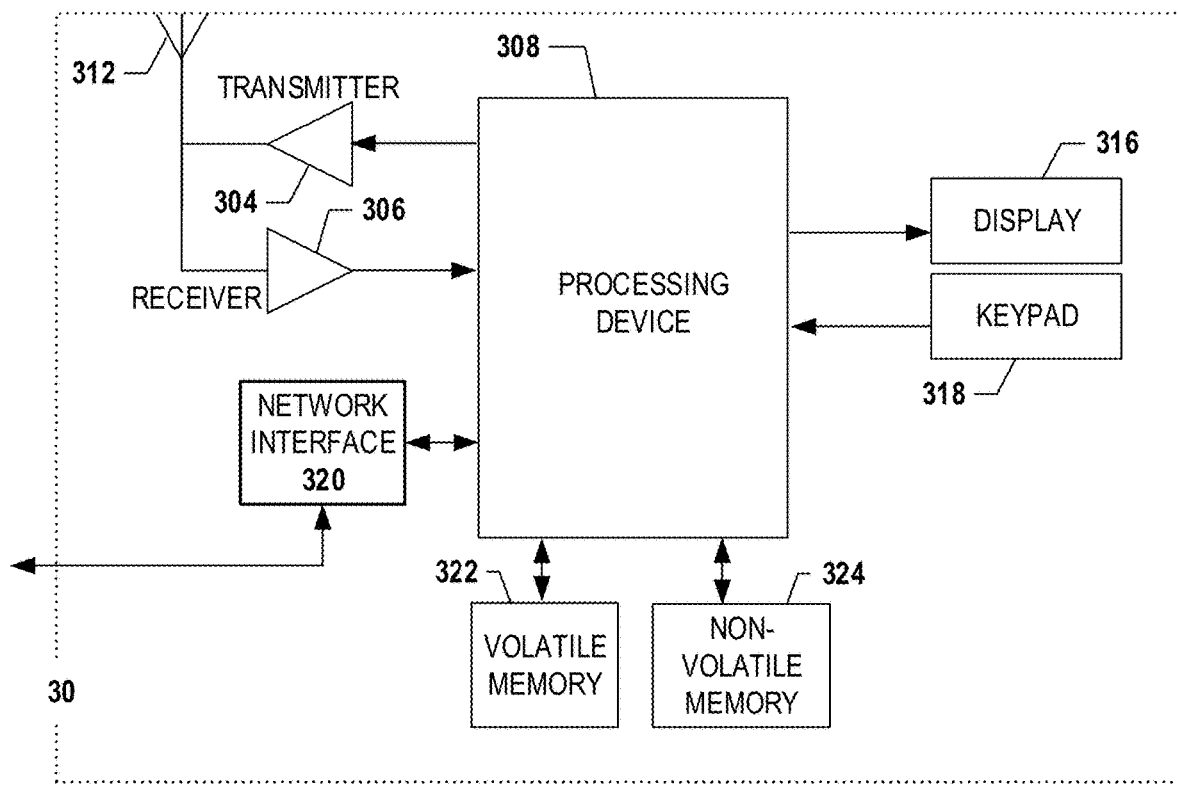
FIG. 3 shows a schematic diagram of a customer computing entity according to one embodiment.

FIG. 3 provides an illustrative schematic representative of customer computing entity 30 that can be used in conjunction with embodiments of the present invention. In certain embodiments, customer computing entities 30 may be mobile computing devices, such as smartphones, tablets, laptops, and/or the like that may be carried by a customer while the customer is at a particular organization's location (e.g., a hospital, a store, and/or the like). As shown in FIG. 3, a customer computing entity 30 can include an antenna 312, a transmitter 304 (e.g., radio), a receiver 306 (e.g., radio), and a processing element 308 that provides signals to and receives signals from the transmitter 304 and receiver 306, respectively. The signals provided to and received from the transmitter 304 and the receiver 306, respectively, may include signaling information/data in accordance with an air interface standard of applicable wireless systems to communicate with various entities, such as a management computing 20, another customer computing entity 30, an employee beacon 40, and/or the like. In this regard, the customer computing entity 30 may be capable of operating with one or more air interface standards, communication protocols, modulation types, and access types. More particularly, the customer computing entity 30 may operate in accordance with any of a number of wireless communication standards and protocols. In a particular embodiment, the customer computing entity 30 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols (e.g., BLE), USB protocols, and/or any other wireless protocol.

Via these communication standards and protocols, the customer computing entity 30 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The customer computing entity 30 can also download changes, add-ons, and updates, for instance, to its firmware, software (e.g., including executable instructions, applications, program modules), and operating system.

According to one embodiment, the customer computing entity 30 may include location determining aspects, devices, modules, functionalities, and/or similar words used herein interchangeably. For example, the customer computing entity 30 may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data may be determined by triangulating the customer computing entity's 30 position in connection with a variety of other systems, including cellular towers, Wi-Fi access points, and/or the like. Similarly, the customer computing entity 30 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing entities (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine the location of someone or something to within inches or centimeters.

The customer computing entity 30 may also comprise a user interface device comprising one or more user input/output interfaces (e.g., a display 316 and/or speaker/speaker driver coupled to a processing element 308 and a touch screen, keyboard, mouse, and/or microphone coupled to a processing element 308). For example, the user output interface may be configured to provide an application, browser, user interface, dashboard, webpage, and/or similar words used herein interchangeably executing on and/or accessible via the customer computing entity 30 to cause display or audible presentation of information/data and for user interaction therewith via one or more user input interfaces. The user input interface can comprise any of a number of devices allowing the customer computing entity 30 to receive data, such as a keypad 318 (hard or soft), a touch display, voice/speech or motion interfaces, scanners, readers, or other input device. In embodiments including a keypad 318, the keypad 318 can include (or cause display of) the conventional numeric (0-9) and related keys (#, *), and other keys used for operating the customer computing entity 30 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the customer computing entity 30 can collect information/data, user interaction/input, and/or the like.

The customer computing entity 30 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the customer computing entity 30.

c. Exemplary Employee Beacons

As discussed herein, employee beacons may be configured for storing employee identification data thereon, and accordingly the employee beacons may comprise a storage device (e.g., a non-transitory computer-readable storage media) that may be configured for storing employee identification data thereon. The employee beacons may also comprise one or more communication interfaces similar to those discussed above in reference to the customer computing entity 30. For example, the employee beacons may be configured for broadcasting the employee identification data to nearby computing entities, via, for example, Bluetooth (e.g., Bluetooth Low Energy (BLE)), RFID, and/or the like. The employee beacons may also be configured for broadcasting the employee identification data via specific file formats enabling computing entities having specifically configured software applications installed thereon to utilize the employee identification data.

In various embodiments, the employee beacons may be tuned to a desired distance and/or frequency of transmission (for example, selected based on the business/industry sector in which the beacons are utilized). As just one example, the frequency of transmission may be selected so as to avoid interference with other transmission protocols, for example, from unrelated technologies. However, it should be understood that the frequency of transmission may be further selected so as to be easily detectable by customer computing entities 30, for example, without requiring updates to customer computing entity 30 settings.

As just one example, an employee beacon may comprise a physical device comprising a memory storage area, a transmitter, a power supply, and/or the like. The power supply may comprise a replaceable and/or rechargeable battery. Embodiments utilizing rechargeable batteries may be configured for wired and/or wireless charging of the onboard power supply. The employee beacon may be small and wearable by an employee. As just one example, the employee beacon may be embodied as at least a portion of a nametag. In such embodiments, the employee beacon may comprise a small housing enclosing at least a portion of the employee beacon components. The small housing may have employee data printed or otherwise included thereon (e.g., as a nametag). The small housing according to various embodiments may further comprise a fastening mechanism (e.g., a clip, a pin, a magnet, hook-and-loop fasteners, and/or the like) for securing the employee beacon onto the employee's garments.

According to certain implementations, each of a plurality of employees of an organization may be assigned an employee beacon storing employee identification data thereon. The employee identification data may comprise, for example, the employee's first name, last name (or last initial), photo, position/job title, degree, years employed at the organization, employee rating to date (e.g., a star rating).

In certain embodiments, the communication interface of the employee beacons may also be configured for receiving data, such as when initially loading employee identification data thereon. The communications interface may comprise a hard-wired interface for receiving data (e.g., via a USB port), or the communications interface may be configured for wirelessly receiving data to be stored locally on the onboard memory storage area.

d. Exemplary Networks

In one embodiment, any two or more of the illustrative components of the architecture of FIG. 1 may be configured to communicate with one another via respective communicative couplings to one or more networks 35. The networks 35 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 35 may have any suitable communication range associated therewith and may include, for example, global networks (e.g., the Internet), MANs, WANs, LANs, or PANs. In addition, the networks 35 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

IV. Exemplary Operation

Described herein are various methodologies for operation of computing entities as described herein. Notably, discussed are methodologies for establishing a system for enabling customer computing entities 30 to detect employee beacons so as to enable a reviewing system; as well as various methodologies associated with the operation of certain embodiments.

a. Set-Up

As noted above, employee beacons may be configured to receive employee data transferred thereto, for example, during an initial set-up process. In certain embodiments, the employee beacons may be configured to accept wireless data transmissions. In other embodiments, the employee beacons may be configured to accept data via a wired data transmission protocol (e.g., via a micro-USB or other wired data transmission protocol) during a setup process.

Figure 8:
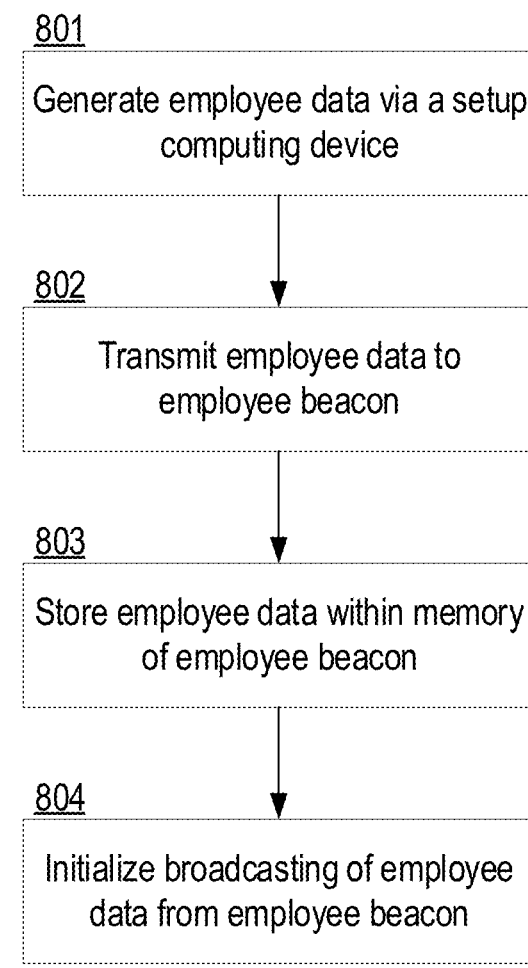
FIG. 8 is a flowchart showing an example functionality for setting up an employee beacon according to certain embodiments.

FIG. 8 illustrates an example process for setting up an employee beacon for an employee according to one embodiment. As shown in FIG. 8, the employee data may be generated at a separate computing entity, such as at a customer computing entity 30, a management computing entity 20, and/or the like. The employee data may be generated based at least in part on user input received at the separate computing entity. In certain embodiments, the management computing entity 20 may be configured to generate one or more graphical user interface screens to guide a user during the setup process for a new employee beacon, and accordingly a user may provide user input into specified data fields within the generated setup user interface to provide employee data for eventual transmission to an employee beacon. In certain embodiments, the employee data generated and/or received at the separate computing entity (e.g., the management computing entity 20) may be tagged with metadata characterizing certain data with specific tags. As just one example, the employee data may be stored in XML format with corresponding data tags for each data type. As discussed in greater detail herein, the data tags may be stored on the employee beacon together with the corresponding employee data (and also transmitted together with the corresponding employee data), such that receiving computing devices, such as customer computing entities 30, may be configured to determine what type of data is provided. As just one example, a "name" data tag may be stored in association with employee data of "Dr. John Smith," such that customer computing entities 30 receiving the employee data may determine that "Dr. John Smith" should be provided within a name field of a display corresponding to the employee.

In embodiments in which the employee data is provided via a graphical user interface maintained by the management computing entity 20, individual data fields within the graphical user interface may correspond with particular data tags, such that data provided by a user into those data fields is automatically associated with the corresponding data tag.

It should be understood that the employee data may be generated and/or received from other sources in certain embodiments. For example, employee data may be retrieved from an employee database (e.g., maintained and/or accessible to the human resources department of an employer). Employee data retrieved from an employee database may be retrieved together with corresponding data tags as discussed above, thereby facilitating generation of employee data for storage on corresponding employee beacons.

With reference to Block 802 of FIG. 8, the employee data is transmitted to the employee beacon for storage thereon. In certain embodiments, transmission of the employee data may be executed via one or more wireless transmission protocols (e.g., via Wi-Fi, BLE, and/or the like). In accordance with certain embodiments in which data transfer is performed via wireless data transfer protocols, the employee beacons may be placed into a setup mode (e.g., by moving a physical switch on the employee beacon) so as to enable receipt of data and/or for modifying data stored thereon. By utilizing a separate setup mode, employee data stored on employee beacons cannot be tampered with by unauthorized users without physical access to the employee beacons themselves.

In other embodiments, employee data may be transmitted to employee beacons via a wired data transmission protocol. By utilizing a wired data transmission protocol, the employee beacons need not include a separate wireless data receiver thereon, which may lower manufacturing costs and/or power consumption of the employee beacons. Moreover, utilizing a wired data transmission protocol for initial setup may minimize the possibility of tampering by unauthorized users, because unauthorized users with nefarious intentions would require physical access to the employee beacon to modify data stored thereon.

In certain embodiments, transmission of the employee data to the employee beacon may comprise generating one or more data packets collectively comprising the employee data and providing the data packets to the employee beacon in a format executable by the employee beacon. In certain embodiments, the employee data may be provided within a .csv data file, a .txt data file, a .xml data file, a .html data file, and/or the like. Once received at the employee beacon, as indicated at Block 803 of FIG. 8, the employee data is stored within an onboard memory of the employee beacon, such that the employee data may be broadcast from the employee beacon during use.

Once the employee data is stored on the employee beacon, the employee beacon may be disconnected from data transfer from the other computing entity (e.g., management computing entity 20). As discussed above, disconnection from the other computing entity may comprise changing an onboard switch away from a setup mode (e.g., into an "off" mode or an "operating" mode). Alternatively, disconnection from the other computing entity may comprise physically disconnecting a data transfer cable from the employee beacon.

Finally, as indicated at Block 804 of FIG. 8, the setup process is complete upon beginning broadcast of the employee data from the employee beacon, for example, for receipt by one or more customer computing entities 30.

It should be understood that in certain embodiments, all of the employee data corresponding to a particular employee may be stored on the employee beacon. In such embodiments, particularly those embodiments in which the employee data comprises data indicative of current employee ratings, the employee data may be periodically updated, for example, via the setup process discussed above, whereby new employee data replaces existing employee data and/or updates existing employee data stored on the employee beacon. These updates may be performed periodically (e.g., while the employee beacon is connected to a separate computing entity and recharging at the end of a work day, while an employee is first beginning his/her workday while the employee switches the employee beacon into a setup mode, and/or the like) and/or continuously (e.g., in embodiments in which the employee beacon functions constantly in both a setup and operation mode simultaneously).

In other embodiments, only a portion of the employee data may be stored on an employee beacon. The employment data stored on the employee beacon may comprise a unique employee identifier that may be utilized to query an employee database comprising additional employee data thereon. Thus, the employee data may be maintained up-todate by updating the employee database, which may be accessed (e.g., directly or indirectly) by one or more customer computing entities 30 seeking to provide detailed employee data to a user. Thus, the data stored on the employee beacon may be minimal, thereby requiring minimal data storage requirements (and power requirements) at the employee beacon. Moreover, the employee data stored on the employee beacon need not be updated (e.g., unless the employee identifier must be updated, for example, to reuse the employee beacon with a different employee), while more detailed employee data may be maintained in a current state by updating data within the employee database that may be constantly accessible to the management computing entity 20.

In a similar embodiment, the employee beacons need not require specific setup of data stored thereon. Each employee beacon may comprise a unique employee beacon identifier that is transmitted therefrom (and may be printed or otherwise visually indicated on the employee beacon itself). The employee beacon identifier may then be stored within employee data stored within an employee database, thereby enabling the employee data to be queried based at least in part on a unique beacon identifier. In such embodiments, the employee beacon identifier may be established during initial manufacturing of the employee beacon, such that no further setup of the employee beacon is required. In such embodiments, an administrator associated with the management computing entity 20 may provide (e.g., via user input) the unique beacon identifier into the employee data stored within the employee database, thereby associating the unique beacon identifier with the employee data for a corresponding employee.

b. First Example Operation

Figure 9:
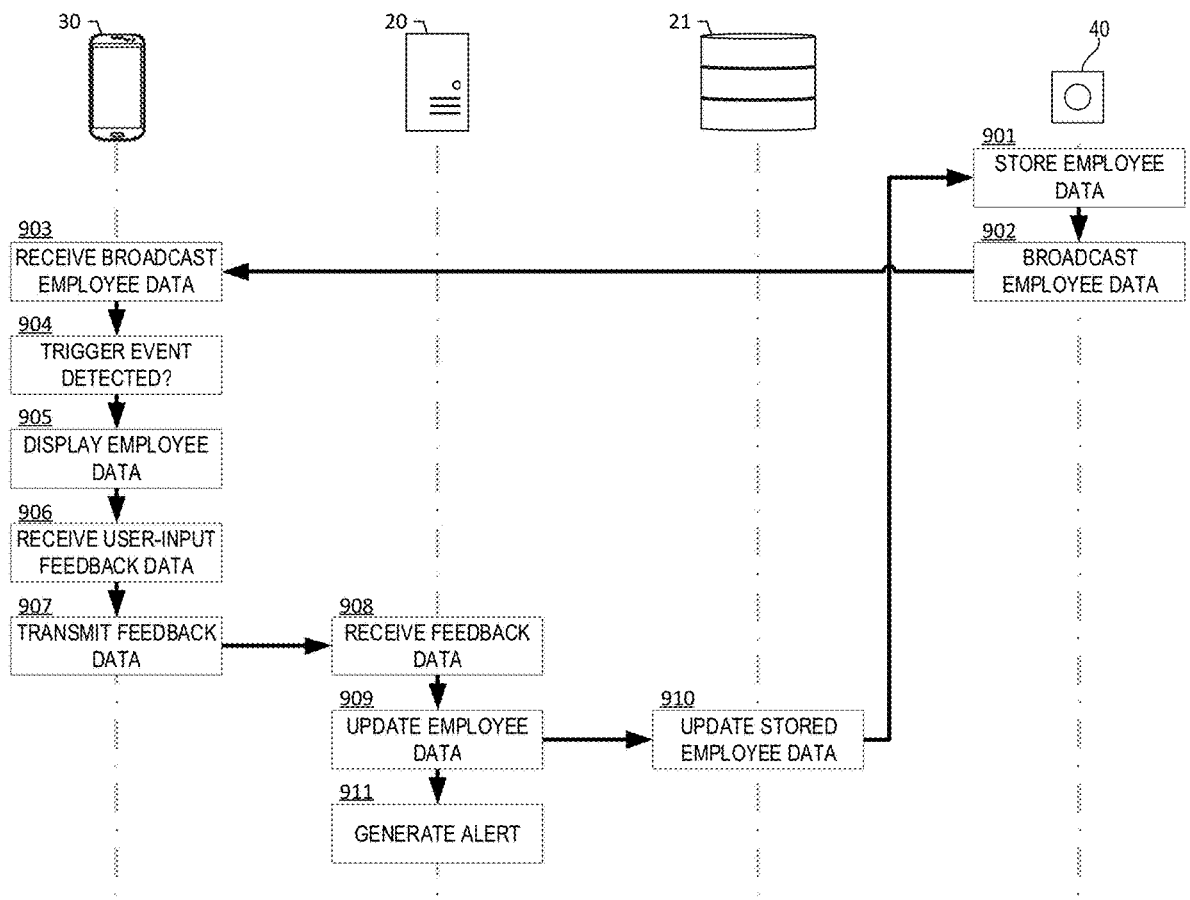
FIGS. 9-10 are flowcharts showing example functionalities of various configurations according to certain embodiments.

FIG. 9 illustrates the operation of an example embodiment in which employee data that is ultimately displayed to a user via a customer computing entity 30 is stored locally on an employee beacon.

As shown at Block 901, and as referenced briefly with respect to FIG. 8, employee data is stored locally on a memory storage device onboard the employee beacon. As discussed above, the employee data may comprise one or more of: a photo of the employee, an indication of the employee's name, title, prior customer rating, and/or other biographic information about the employee. In certain embodiments, the employee data may further comprise a unique employee identifier and/or a unique beacon identifier (to uniquely identify the employee and/or beacon, respectively).

As shown at Block 902, the employee data is broadcast from the employee beacon 40, via one or more wireless transmission protocols. As examples, the employee data may be broadcast periodically and/or continuously, via Bluetooth (BLE), Wi-Fi, and/or the like. In certain embodiments, broadcasting the employee data to one or more customer computing entities 30 may comprise forming a handshake to enable data transmission between the employee beacon 40 and the customer computing entities 30. However, in certain embodiments, individual employee beacons 40 need not form individual handshakes with individual customer computing entities 30.

As indicated at Block 903, a customer computing entity 30 receives the employee data broadcast from the employee beacon. Because the employee beacon 40 of certain embodiments is characterized by a limited broadcast range based on a limited broadcast power of the employee beacon 40 (as discussed above, the broadcast range may be user defined in certain embodiments) so as to provide functionality appropriate for the particular use case. As a non-limiting example of usage in a healthcare context, the broadcast range of the employee beacon may be set to be approximately equal to half of the length and/or width of a hospital patient room, so that the patient's customer computing entity 30 (assumed to be located approximately at the center of the patient room, adjacent the patient bed) is within the broadcast range of the employee beacon 40 while a hospital employee is present within the patient room.

As indicated at Block 904, the customer computing entity 30 monitors the received employee data broadcast to determine whether a trigger event occurs. For example, a trigger event may be a determination that the signal strength of the broadcast employee data reaches a threshold strength (e.g., a minimum threshold strength). As another example, a trigger event may be a consecutive period of time during which the broadcast employee data signal is detected (indicative of a minimum amount of time the employee is located near the customer). In certain embodiments, a trigger event may be the completion of a series of discrete occurrences, such as the completion of a series of events comprising: detecting that a particular employee beacon 40 is proximate the customer computing entity 30 for at least a minimum consecutive time period, then detection that the employee beacon 40 has moved away from the customer computing entity 30 (such that the customer computing entity 30 no longer detects signals broadcast from the employee beacon), then detection of an elapsed minimum amount of time during which the employee beacon 40 is not detected. Practically speaking, such a series of events could be a proxy for a determination that the employee was near the customer for least a minimum amount of time, the employee then left the customer's presence (such as at the end of a customer service interaction), and the employee was located at least some minimum distance away from the customer for at least a minimum amount of time (such that the customer does not feel pressured to leave a positive review of the employee while the employee is watching the customer).

Trigger events of certain embodiments may be based at least in part on the operation and/or location of the customer computing entity 30 in certain embodiments. For example, a trigger event may be the determination that the customer has left a particular physical location (e.g., leaving a retail store for which the review is to be left).

It should be understood that other trigger events may be utilized in certain embodiments. The customer computing entity 30 may be configured to continue monitoring the broadcast employee data signal, without further action, until detection of the occurrence of the trigger event.

As discussed in reference to the remainder of FIG. 9, the customer computing entity 30 is configured to utilize at least a portion of the employee data received from the employee beacon 40 upon the detection of a trigger event, and therefore the customer computing entity 30 may be configure to store—at least temporarily—the received employee data locally within a memory storage area of the customer computing entity 30 (e.g., within an employee data cache storage area of the customer computing entity 30). Particularly for embodiments in which the trigger event comprises a determination that the employee beacon 40 is no longer detected by the customer computing entity 30 (and therefore the customer computing entity can no longer receive employee data directly from the employee beacon 40), storing the employee data locally on the customer computing entity 30 enables execution of further steps as discussed in greater detail herein. It should be understood that the employee data stored locally on the customer computing entity 30 may be deleted, for example, upon requested by a user (e.g., receipt of user input requesting that the employee data cache be cleared), upon the occurrence of a cache clearing trigger event (e.g., the elapsing of a defined period of time after receipt of the employee data; upon receipt of user input providing feedback data, as discussed herein, and/or the like).

Upon detection of the trigger event, as shown at Block 905 of FIG. 9, the customer computing entity 30 displays employee data to a user. As an example, after a physician has spent at least a minimum amount of time near a patient within a patient's room (and after the elapsing of a period of time after the customer computing entity 30 detects that the physician has left the room), the customer computing entity 30 displays employee data to the user within a graphical user interface. The customer computing entity 30 may display the data to the user via any of a variety of display strategies. As just one example, the employee data may be presented to the user as a banner and/or an alert that is displayed to the user regardless of what the user is currently doing on his/her customer computing entity 30 (or whether or not the user is currently using the customer computing entity 30 at all). Thus, the banner and/or alert may pop-up on the user's device to provide the user with easy access to a graphical user interface providing employee data. The banner or alert may itself comprise at least a portion of the employee data (e.g., the name of the employee only), and the banner and/or alert may be embodied as, or may comprise, a hyperlink which causes the customer computing entity 30 to initialize an application to present a graphical user interface with more complete employee data. For example, upon the user selecting a displayed banner indicating "See more information about your doctor, Dr. John Smith," the customer computing entity 30 may launch a rating application, which provides a graphical user interface showing one or more aspects of the employee data, such as the doctor's photo, name, education, hospital affiliation, current rating, and/or the like.

Moreover, the displayed graphical user interface may further comprise one or more user-interaction elements configured to receive user input of a rating provided by the user for the particular employee. The user-interaction elements may comprise free-text fields, selectable star ratings, and/or the like. As indicated at Block 906, the customer computing entity 30 receives user-input feedback data, which may be embodied as a rating, free-text feedback data, and/or the like, collected via the displayed graphical user interface.

The customer computing entity 30 transmits the feedback data to the management computing entity 20, as indicated at Blocks 907-908. The customer computing entity 30 may transmit the feedback data via any of a variety of network connection protocols. Moreover, the feedback data is transmitted from the customer computing entity 30 together with at least a portion of the employee data (e.g., employee identifying data), thereby enabling the management computing entity 20 to associate the newly received feedback data with an appropriate employee profile, such that the stored employee data may be updated to reflect the newly received feedback data.

In certain embodiments, the feedback data may be provided from the customer computing entity 30 anonymously, such as in embodiments in which a customer is not required to sign-in to a customer account, and/or a customer is not required to provide any personally identifying data prior to generating feedback data for particular employee interactions. Because the customer computing entity may be limited to providing feedback data regarding employees for which the customer had a personal customer service interaction with (as determined by proxy, for example, based on detected employee data received at the customer computing entity and satisfying applicable criteria), even anonymous feedback may be provided while ensuring that feedback is only provided for real, actual customer service interactions.

In other embodiments however, a customer may be prevented from providing feedback data until the customer signs-into a customer account. The customer account may be associated with a customer profile stored in a customer database accessible to the management computing entity 20. In certain embodiments, the customer profile may comprise a unique customer identifier, as well as identifying data regarding the customer. In certain embodiments, the identifying data of the customer may comprise a customer name, a customer contact information (e.g., a phone number, an email address, a user name for one or more social networks, and/or the like), a customer date of birth, and/or the like. Moreover, as discussed herein, the customer profile may comprise a log of historical customer service interactions experienced by the customer. The log may comprise a plurality of historical entries each reflecting a particular historical service interaction. Each historical entry may comprise employee data of an employee with whom the customer interacted, the day and/or time during which the customer service interaction occurred, an organization (e.g., employer of the employee) relating to the customer service interaction, feedback data provided by the customer in response to the customer service interaction, and/or the like. In embodiments in which a customer has corresponding customer data, the feedback data generated at the customer computing entity 30 may be provided together with customer identifying data, such that the feedback data (and the customer service interaction) may be associated with the customer profile (e.g., the log stored in association with the customer profile). In certain embodiments, the feedback data may remain anonymous from the perspective of the employer/employee (such that the unique customer identifier is removed from the feedback data before providing the feedback data to the employer/employee). However, in other embodiments the feedback data is provided to the employer/employee together with the customer identifier data, such that the employer/employee may quickly locate who provided the feedback so as to take remedial measures with the customer, if necessary.

As shown at Block 909, the management computing entity 20 updates the employee data to reflect the newly received feedback data. For example, the management computing entity 20 may add free text feedback data to an employee profile (for example, together with metadata, such as reflecting dates/times when the feedback data was first received), such that it may be displayed to future users (e.g., when displaying employee data, as discussed in reference to Block 905, above). In other embodiments, the management computing entity 20 may further calculate an updated rating/score for the employee (e.g., averaging the rating of all feedback data received for the employee). It should be understood that any of a variety of techniques may be utilized to update the employee data. As reflected in Block 910, the updated employee data may be stored within the employee database 21, and/or may be updated within the local memory of the employee beacon 40, as indicated at Block 901.

In certain embodiments, the management computing entity 20 may be further configured to update a customer profile so as to include a historical data record relating to the customer service interaction within the log of the customer profile. As noted above, each historical data entry may comprise employee data of an employee with whom the customer interacted, the day and/or time during which the customer service interaction occurred, an organization (e.g., employer of the employee) relating to the customer service interaction, feedback data provided by the customer in response to the customer service interaction, and/or the like.

As reflected at Block 911 of FIG. 9, the management computing entity 20 may be further configured to generate an alert that may be provided to one or more users (e.g., an employee's supervisor) in accordance with certain circumstances. For example, upon determining that a negative review has been provided for a particular employee, the management computing entity 20 may be configured to generate and transmit an alert in real-time to be provided to the employee's supervisor (e.g., via a computing entity in the supervisor's possession), thereby enabling the employee's supervisor to address any customer concerns immediately (e.g., either through discussing an incident with the employee, offering a discount to the customer, discussing the incident with the customer, and/or the like). In certain embodiments, the alert may comprise alert data comprising employee identifier data, customer identifier data (if available), the feedback data, the day/time during which the customer service interaction occurred, and/or the like.

It should be understood that alerts may be generated as reflected at Block 911 only upon the occurrence of defined alert trigger events, such as receipt of a review having a maximum rating (e.g., 4 of 5 starts, 3 of 5 stars, 2 of 5 stars, and/or the like). In other embodiments, an alert may be generated after every received review, thereby enabling the employee's supervisor to congratulate the employee for exceptional service, or to discuss any problematic service provided by the employee.

c. Second Example Operation

Figure 10:
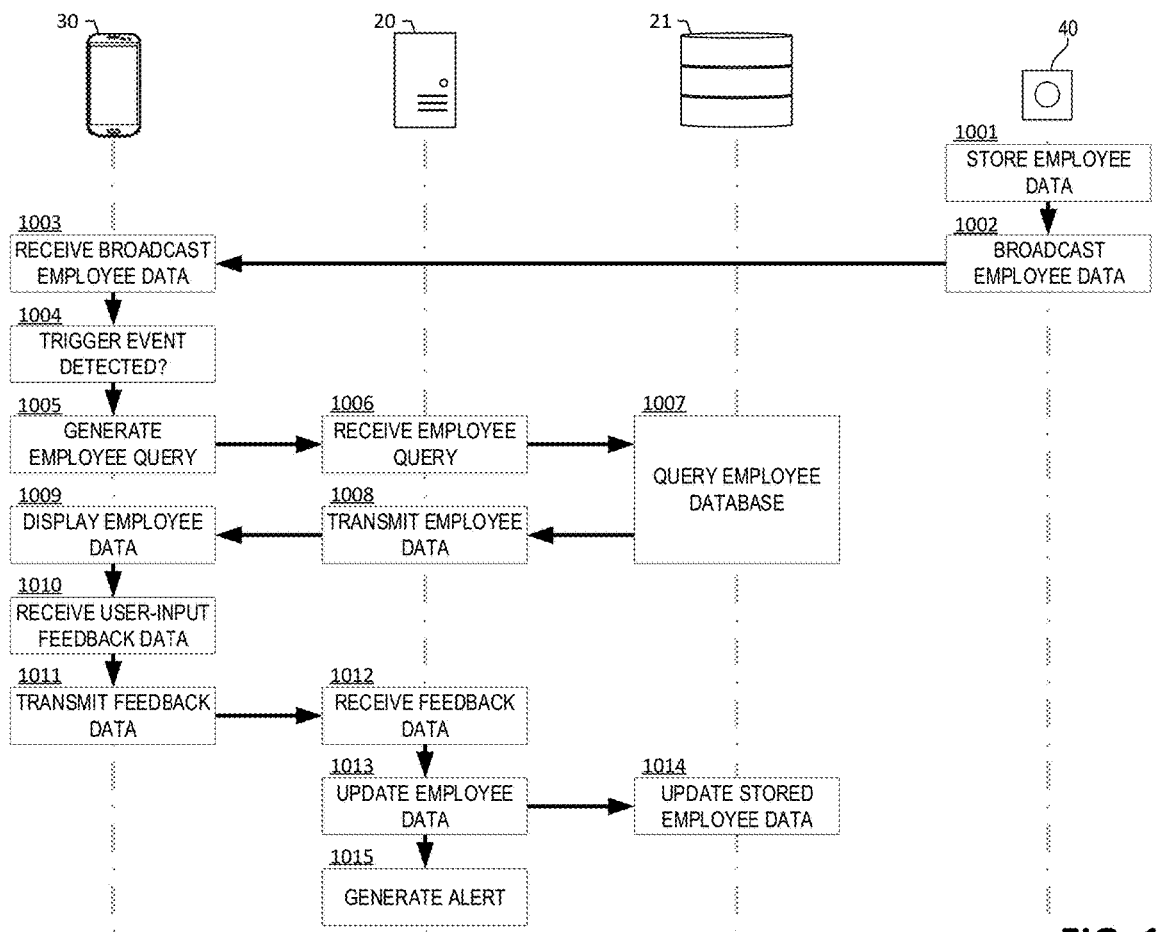

FIG. 10 illustrates the operation of an example embodiment in which employee data that is ultimately displayed to a user via a customer computing entity 30 is stored within an employee database that may be queried based on employee data (e.g., an employee identifier, a beacon identifier, and/or the like) stored on an employee beacon.

As shown at Block 1001, at least a portion of employee data is stored locally on a memory storage device onboard the employee beacon. The employee data stored locally on the memory storage device onboard the employee beacon may encompass employee identifying data sufficient to identify the employee, such that additional employee data may be retrieved from an employee database 21. In certain embodiments, the employee identifying data stored locally on the memory storage device onboard the employee beacon may comprise and/or may be embodied as a unique employee identifier, a unique employee beacon identifier, and/or the like.

As shown at Block 1002, the employee data (e.g., the employee identifying data) is broadcast from the employee beacon 40, via one or more wireless transmission protocols. As examples, the employee data may be broadcast periodically and/or continuously, via Bluetooth (BLE), Wi-Fi, and/or the like. In certain embodiments, broadcasting the employee data to one or more customer computing entities 30 may comprise forming a handshake to enable data transmission between the employee beacon 40 and the customer computing entities 30. However, it should be understood that in certain embodiments, individual employee beacons 40 need not form individual handshakes with individual customer computing entities 30. Particularly where the employee data broadcast from the employee beacon 40 encompasses only employee identifying data, the employee beacon 40 need not form a handshake with individual customer computing entities 30, and an individual customer computing entity 30 may, through a specifically configured app executing on the customer computing entity 30, recognize that the received employee identifying data is received from an employee beacon 40, and may initialize applicable steps to retrieve additional employee data to present to the user. It should be understood that under certain implementations, the configured app executing on the customer computing entity 30 may require access permissions to the customer computing entity 30 connections management software/firmware such that the configured app may recognize data transmissions from employee beacons 40 without handshake connections.

As indicated at Block 1003, a customer computing entity 30 receives the employee data broadcast from the employee beacon. Because the employee beacon 40 of certain embodiments is characterized by a limited broadcast range based on a limited broadcast power of the employee beacon 40 (as discussed above, the broadcast range may be user defined in certain embodiments) so as to provide functionality appropriate for the particular use case.

As indicated at Block 1004, the customer computing entity 30 monitors the received employee data broadcast to determine whether a trigger event occurs. For example, a trigger event may be a determination that the signal strength of the broadcast employee data reaches a threshold strength (e.g., a minimum threshold strength). As another example, a trigger event may be a consecutive period of time during which the broadcast employee data signal is detected (indicative of a minimum amount of time the employee is located near the customer). In certain embodiments, a trigger event may be the completion of a series of discrete occurrences, such as the completion of a series of events comprising: detecting that a particular employee beacon 40 is proximate the customer computing entity 30 for at least a minimum consecutive time period, then detection that the employee beacon 40 has moved away from the customer computing entity 30 (such that the customer computing entity 30 no longer detects signals broadcast from the employee beacon), then detection of an elapsed minimum amount of time during which the employee beacon 40 is not detected. Practically speaking, such a series of events could be a proxy for a determination that the employee was near the customer for least a minimum amount of time, the employee then left the customer's presence (such as at the end of a customer service interaction), and the employee was located at least some minimum distance away from the customer for at least a minimum amount of time (such that the customer does not feel pressured to leave a positive review of the employee while the employee is watching the customer).

Trigger events of certain embodiments may be based at least in part on the operation and/or location of the customer computing entity 30 in certain embodiments. For example, a trigger event may be the determination that the customer has left a particular physical location (e.g., leaving a retail store for which the review is to be left).

It should be understood that other trigger events may be utilized in certain embodiments. The customer computing entity 30 may be configured to continue monitoring the broadcast employee data signal, without further action, until detection of the occurrence of the trigger event.

As discussed in reference to the remainder of FIG. 9, the customer computing entity 30 is configured to utilize at least a portion of the employee data received from the employee beacon 40 upon the detection of a trigger event, and therefore the customer computing entity 30 may be configure to store—at least temporarily—the received employee data locally within a memory storage area of the customer computing entity 30 (e.g., within an employee data cache storage area of the customer computing entity 30). Particularly for embodiments in which the trigger event comprises a determination that the employee beacon 40 is no longer detected by the customer computing entity 30 (and therefore the customer computing entity can no longer receive employee data directly from the employee beacon 40), storing the employee data locally on the customer computing entity 30 enables execution of further steps as discussed in greater detail herein. It should be understood that the employee data stored locally on the customer computing entity 30 may be deleted, for example, upon requested by a user (e.g., receipt of user input requesting that the employee data cache be cleared), upon the occurrence of a cache clearing trigger event (e.g., the elapsing of a defined period of time after receipt of the employee data; upon receipt of user input providing feedback data, as discussed herein, and/or the like).

Upon detection of the trigger event, as shown in Block 1005 of FIG. 10, the customer computing entity 30 generates an employee query comprising the employee data received from the employee beacon 40 (e.g., the employee identifying data). The customer computing entity 30 may transmit the employee query to the management computing entity 20, which receives the employee query (as reflected at Block 1006) and queries the employee database 21 (as reflected at Block 1007). The query causes the employee database 21 to retrieve additional employee data corresponding to the employee (e.g., the employee's photo, name, current rating, education, and/or the like) and provide that additional employee data to the management computing entity 20 for transmission to the customer computing entity 30 in response to the query, as reflected at Block 1008. In certain embodiments, the response provided to the customer computing entity 30 comprises the employee data (e.g., employee identifying data) that was originally contained within the employee query, so that the newly received employee data may be matched with the employee query provided by the customer computing entity 30.

As reflected at Block 1009 of FIG. 10, upon receipt of the employee data from the management computing entity 20, the customer computing entity 30 displays employee data to a user, for example within a graphical user interface. As discussed in reference to FIG. 9, the customer computing entity 30 may display the data to the user via any of a variety of display strategies. As just one example, the employee data may be presented to the user as a banner and/or an alert that is displayed to the user regardless of what the user is currently doing on his/her customer computing entity 30 (or whether or not the user is currently using the customer computing entity 30 at all). Thus, the banner and/or alert may pop-up on the user's device to provide the user with easy access to a graphical user interface providing employee data. The banner or alert may itself comprise at least a portion of the employee data (e.g., the name of the employee only), and the banner and/or alert may be embodied as, or may comprise, a hyperlink which causes the customer computing entity 30 to initialize an application to present a graphical user interface with more complete employee data. For example, upon the user selecting a displayed banner indicating "See more information about your doctor, Dr. John Smith," the customer computing entity 30 may launch a rating application, which provides a graphical user interface showing one or more aspects of the employee data, such as the doctor's photo, name, education, hospital affiliation, current rating, and/or the like.

Moreover, the displayed graphical user interface may further comprise one or more user-interaction elements configured to receive user input of a rating provided by the user for the particular employee. The user-interaction elements may comprise free-text fields, selectable star ratings, and/or the like. As indicated at Block 1010, the customer computing entity 30 receives user-input feedback data, which may be embodied as a rating, free-text feedback data, and/or the like, collected via the displayed graphical user interface.

The customer computing entity 30 transmits the feedback data to the management computing entity 20, as indicated at Blocks 1011-1012. The customer computing entity 30 may transmit the feedback data via any of a variety of network connection protocols. Moreover, the feedback data is transmitted from the customer computing entity 30 together with at least a portion of the employee data (e.g., employee identifying data), thereby enabling the management computing entity 20 to associate the newly received feedback data with an appropriate employee profile, such that the stored employee data may be updated to reflect the newly received feedback data.

In certain embodiments, the feedback data may be provided from the customer computing entity 30 anonymously, such as in embodiments in which a customer is not required to sign-in to a customer account, and/or a customer is not required to provide any personally identifying data prior to generating feedback data for particular employee interactions. Because the customer computing entity may be limited to providing feedback data regarding employees for which the customer had a personal customer service interaction with (as determined by proxy, for example, based on detected employee data received at the customer computing entity and satisfying applicable criteria), even anonymous feedback may be provided while ensuring that feedback is only provided for real, actual customer service interactions.

In other embodiments however, a customer may be prevented from providing feedback data until the customer signs-into a customer account. The customer account may be associated with a customer profile stored in a customer database accessible to the management computing entity 20. In certain embodiments, the customer profile may comprise a unique customer identifier, as well as identifying data regarding the customer. In certain embodiments, the identifying data of the customer may comprise a customer name, a customer contact information (e.g., a phone number, an email address, a user name for one or more social networks, and/or the like), a customer date of birth, and/or the like. Moreover, as discussed herein, the customer profile may comprise a log of historical customer service interactions experienced by the customer. The log may comprise a plurality of historical entries each reflecting a particular historical service interaction. Each historical entry may comprise employee data of an employee with whom the customer interacted, the day and/or time during which the customer service interaction occurred, an organization (e.g., employer of the employee) relating to the customer service interaction, feedback data provided by the customer in response to the customer service interaction, and/or the like. In embodiments in which a customer has corresponding customer data, the feedback data generated at the customer computing entity 30 may be provided together with customer identifying data, such that the feedback data (and the customer service interaction) may be associated with the customer profile (e.g., the log stored in association with the customer profile). In certain embodiments, the feedback data may remain anonymous from the perspective of the employer/employee (such that the unique customer identifier is removed from the feedback data before providing the feedback data to the employer/employee). However, in other embodiments the feedback data is provided to the employer/employee together with the customer identifier data, such that the employer/employee may quickly locate who provided the feedback so as to take remedial measures with the customer, if necessary.

As shown at Block 1013, the management computing entity 20 updates the employee data to reflect the newly received feedback data. For example, the management computing entity 20 may add free text feedback data to an employee profile (for example, together with metadata, such as reflecting dates/times when the feedback data was first received), such that it may be displayed to future users (e.g., when displaying employee data, as discussed in reference to Block 1009, above). In other embodiments, the management computing entity 20 may further calculate an updated rating/score for the employee (e.g., averaging the rating of all feedback data received for the employee). It should be understood that any of a variety of techniques may be utilized to update the employee data. As reflected in Block 1014, the updated employee data may be stored within the employee database 21 such that it may be retrieved during layer queries of the employee database (e.g., as reflected at Block 1007 discussed above).

In certain embodiments, the management computing entity 20 may be further configured to update a customer profile so as to include a historical data record relating to the customer service interaction within the log of the customer profile. As noted above, each historical data entry may comprise employee data of an employee with whom the customer interacted, the day and/or time during which the customer service interaction occurred, an organization (e.g., employer of the employee) relating to the customer service interaction, feedback data provided by the customer in response to the customer service interaction, and/or the like.

As reflected at Block 1015 of FIG. 10, the management computing entity 20 may be further configured to generate an alert that may be provided to one or more users (e.g., an employee's supervisor) in accordance with certain circumstances. For example, upon determining that a negative review has been provided for a particular employee, the management computing entity 20 may be configured to generate and transmit an alert in real-time to be provided to the employee's supervisor (e.g., via a computing entity in the supervisor's possession), thereby enabling the employee's supervisor to address any customer concerns immediately (e.g., either through discussing an incident with the employee, offering a discount to the customer, discussing the incident with the customer, and/or the like).

It should be understood that alerts may be generated as reflected at Block 911 only upon the occurrence of defined alert trigger events, such as receipt of a review having a maximum rating (e.g., 4 of 5 starts, 3 of 5 stars, 2 of 5 stars, and/or the like). In other embodiments, an alert may be generated after every received review, thereby enabling the employee's supervisor to congratulate the employee for exceptional service, or to discuss any problematic service provided by the employee.

V. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

Figure 6:

Also discussed specifically in reference to usage of the various methods and systems while a customer is located at an organization's location, it should be understood that various embodiments may be utilized in other environments. For example, for delivery/courier implementations, "housecall" service implementations, and/or the like (illustrated in FIG. 6), the embodiments discussed herein may be configured for providing employee identification data to a customer while the employee is located at the customer's location. Thus, for example, courier employees may transmit employee identification data from employee beacons carried by the employees, through walls, doors, windows, and/or the like to customer computing devices located within a customer's home (or other location). Because the described employee beacons do not require a separately maintained network for transmission of employee identification data, the embodiments discussed herein may be utilized in any environment in which a customer has a computing entity configured for receiving the employee identification data.

Figure 7:
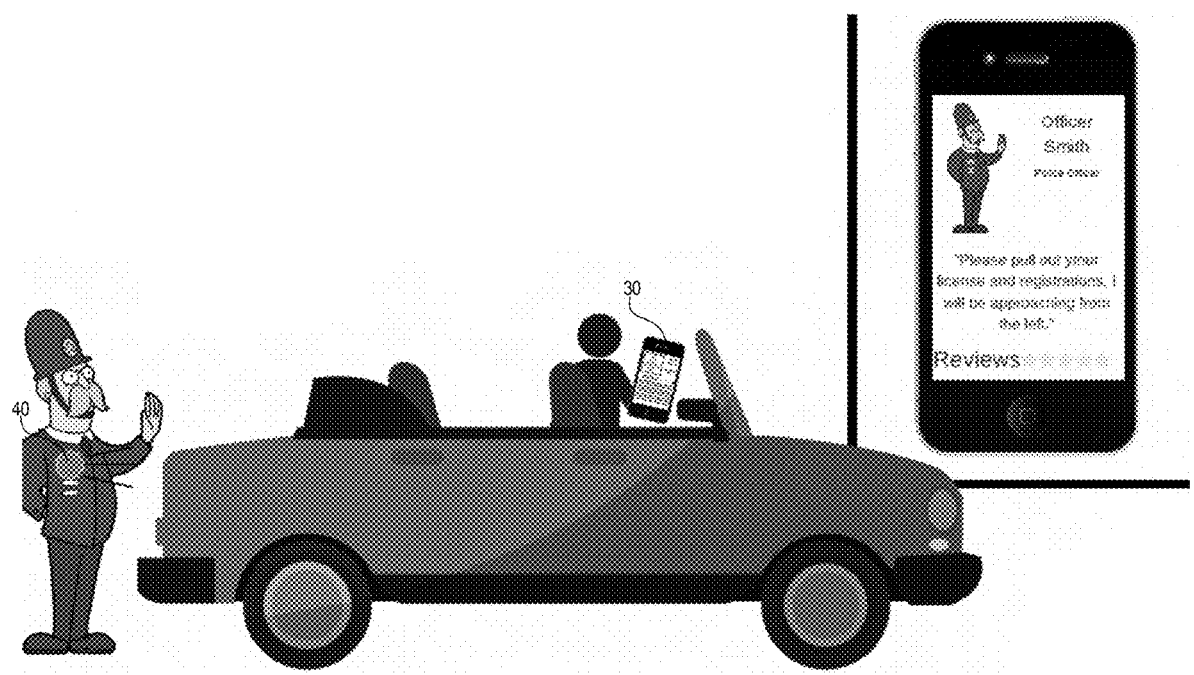

As yet another example, various embodiments may be utilized in public safety environments. Public and/or private safety personnel (e.g., police officers, firefighters, paramedics, military personnel, private security firm personnel, and/or the like) may carry employee beacons that may be configured to provide employee-specific data to nearby computing entities, such as customer computing entities. With reference specifically to the embodiment shown in FIG. 7, an employee beacon associated with a police officer may transmit data indicative of the police officer's identity to a customer computing entity possessed by an individual involved in a traffic stop. The individual may review information about the police officer before being approached, such that the individual is aware of the identity of the police officer. Moreover, the information provided from the police officer's beacon may provide brief instructions to the individual, such as requesting that the individual provide license and registration information when the police officer arrives. In certain embodiments, the beacons utilized by public safety officers (and/or others) may be configured to record the associated public safety officer's location (e.g., via triangulation technologies, GPS technologies, and/or the like). Such beacons may thereby be configured for determining whether a particular public safety officer (or other individual) complies with assigned security rounds, and/or the like.

Although various embodiments are discussed herein as utilizing a specially configured software app executable on a customer's computing entity to receive and/or process data from various beacons, it should be understood that such functionality may be made a part of a computing entity operating system, firmware, and/or the like. In other embodiments, data received at a customer's computing entity from a beacon may cause the customer's computing entity to provide applicable data received from the beacon without requiring specialized software. In certain embodiments, various functionality provided by a customer's computing entity 30 may be provided through a software development kit (SDK), through which the functionality discussed herein may be incorporated into a multi-function app executable via a customer computing entity 30. As just one example, the functionality discussed here (e.g., for recognizing employee data received at the customer computing entity 30, for graphically depicting the employee data, for receiving feedback data, and/or for transmitting data to the management computing entity) may included as features of an app, such as a navigational app, an information app, a customer loyalty app, a payment app, an electric health records system-related app (e.g., EPIC), and/or any other app type.

In certain embodiments, the customer computing entities 30 may be configured to track interactions between the customer computing entity 30 and one or more employee beacons 40 (e.g., to create a local log of historical entries of customer-service interactions), such that individual customers can later reference the employee data of employees with whom the customers have interacted with in the past. In certain embodiments, at least a portion of the employee data may be stored locally on the customer computing entity 30 for reference by the customer (e.g., with or without utilizing queries to the management computing entity 20 to retrieve additional employee data), or the employee data may be stored at the management computing entity 20, for example, in association with a customer profile identifying employees with whom the customer has interacted with in the past, as discussed herein. In the latter embodiments, a customer may access the employee data of past customer service interactions by generating a historical data query (e.g., a specific historical data query comprising filter criteria to limit the results of the query to customer service interactions satisfying a particular requirement, such as customer service interactions at a particular business/organization; or a general historical data query to retrieve employee data associated with all of the customer's historical customer service interactions) that is transmitted to the management computing entity 20. The management computing entity 20 may then retrieve employee data relevant to the historical customer service interactions associated with the historical data query, and the management computing entity 20 may provide the employee data to the requesting customer computing entity 30.

That which is claimed:

1. A system for providing employee data regarding customer-service interactions to a customer computing entity, the system comprising:
   one or more employee beacons configured to be carried by an employee, each of the one or more employee beacons comprising:
      a memory storage area storing employee data and employee identifying data corresponding to a respective employee, and
      a wireless transmitter configured to broadcast the employee data stored within the memory storage area for receipt by a customer computing entity; and
   a management computing entity comprising:
      one or more memory storage areas collectively storing a plurality of employee profiles; and
      one or more processors collectively configured to:
         receive, from a customer computing entity, feedback data and employee data;
         update an employee profile of the plurality of employee profiles corresponding to the employee data to reflect the feedback data;
         receive, from the customer computing entity, the employee identifying data;
         query the one or more memory storage areas to retrieve additional employee data corresponding to the employee identifying data; and
         transmit, to the customer computing entity, at least a portion of the additional employee data.

2. The system of claim 1, wherein the one or more processors of the management computing entity are further configured to transmit to a corresponding employee beacon, update data to reflect updates to the employee profile to reflect the feedback data.

3. The system of claim 1, wherein the wireless transmitter of each of the one or more employee beacons is embodied as a Bluetooth Low Energy wireless transmitter.

4. The system of claim 1, wherein the one or more processors of the management computing entity are further configured to:
   receive, from the customer computing entity, a customer identifier with the feedback data and the employee data; and
   store, within a customer profile corresponding to customer identifier, at least a portion of the employee data.

5. The system of claim 1, wherein the one or more processors of the management computing entity are further configured to generate an alert upon receipt of the feedback data.

6. A computer-implemented method for providing employee data regarding customer-service interactions to a customer computing entity, the method comprising:
   wirelessly broadcasting, from an employee beacon, employee data and employee identifying data stored within a memory storage area of the employee beacon for receipt by a customer computing entity; and
   receiving, via one or more processors of a management computing entity and from a customer computing entity, feedback data and employee data;
   updating, via the one or more processors of the management computing entity, an employee profile of a plurality of employee profiles stored within an employee database corresponding to the employee data to reflect the feedback data;
   receiving, via the one or more processors of the management computing entity and from the customer computing entity, the employee identifying data;
   querying, via the one or more processors of the management computing entity, the one or more memory storage areas to retrieve additional employee data corresponding to the employee identifying data; and
   transmitting, via the one or more processors of the management computing entity and to the customer computing entity, at least a portion of the additional employee data.

7. The computer-implemented method of claim 6, further comprising transmitting, from the one or more processors of the management computing entity to a corresponding employee beacon, update data to reflect updates to the employee profile to reflect the feedback data.

8. The computer-implemented method of claim 6, wherein broadcasting employee data from the employee beacon comprises broadcasting via a Bluetooth Low Energy wireless transmission protocol.

9. The computer-implemented method of claim 6, further comprising:

receiving, via the one or more processors of the management computing entity and from the customer computing entity, a customer identifier with the feedback data and the employee data; and storing, via the one or more processors of the management computing entity and within a customer profile corresponding to customer identifier, at least a portion of the employee data.

10. The computer-implemented method of claim 6, further comprising generating, via the one or more processors of the management computing entity, an alert upon receipt of the feedback data.

11. A computer-program product for providing employee data regarding customer-service interactions to a customer computing entity, the computer program product comprising at least one non-transitory computer-readable storage medium having computer-readable program code portions stored therein, the computer-readable program code portions comprising an executable portion configured to:

wirelessly broadcast, from an employee beacon, employee data and employee identifying data stored within a memory storage area of the employee beacon for receipt by a customer computing entity; and receive, via one or more processors of a management computing entity and from a customer computing entity, feedback data and employee data, wherein the feedback data corresponds to employee data received at the customer computing entity from an employee beacon wirelessly broadcasting the employee data;

update, via the one or more processors of the management computing entity, an employee profile of a plurality of employee profiles stored within an employee database corresponding to the employee data to reflect the feedback data;

receive, via the one or more processors of the management computing entity and from the customer computing entity, the employee identifying data;

query, via the one or more processors of the management computing entity, the one or more memory storage areas to retrieve additional employee data corresponding to the employee identifying data; and transmit, via the one or more processors of the management computing entity and to the customer computing entity, at least a portion of the additional employee data.

12. The computer program product of claim 11, further comprising executable portions configured to transmit, from the one or more processors of the management computing entity to a corresponding employee beacon, update data to reflect updates to the employee profile to reflect the feedback data.

13. The computer program product of claim 11, further comprising executable portions configured to:

receive, from the customer computing entity, a customer identifier with the feedback data and the employee data; and store at least a portion of the employee data within a customer profile corresponding to customer identifier.

14. The computer program product of claim 11, further comprising executable portions configured to generate an alert upon receipt of the feedback data.

* * * * *